(12) United States Patent
Kashima

(10) Patent No.: US 6,624,937 B2
(45) Date of Patent: *Sep. 23, 2003

(54) POLARIZATION SPLITTING SHEET, OPTICAL SHEET LAMINATE, PLANAR LIGHT SOURCE APPARATUS, AND TRANSMISSION-TYPE DISPLAY APPARATUS

(75) Inventor: Keiji Kashima, Shinjuku-ku (JP)

(73) Assignee: Dai Nippon Printing Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,691

(22) Filed: Apr. 5, 1999

(65) Prior Publication Data

US 2002/0012169 A1 Jan. 31, 2002

(30) Foreign Application Priority Data

Apr. 6, 1998 (JP) .......... 10-093560

(51) Int. Cl.$^7$ .................. G02B 5/30
(52) U.S. Cl. .......... 359/495; 359/443; 359/452; 359/453; 359/492; 359/599; 349/57; 349/62; 349/65
(58) Field of Search .......... 349/57, 62, 65; 359/443, 452, 453, 495, 599, 492

(56) References Cited

U.S. PATENT DOCUMENTS

| | | | |
|---|---|---|---|
| 3,609,000 A | * | 9/1971 | Miyano et al. .......... 359/453 |
| 3,655,262 A | * | 4/1972 | DePalma .......... 359/453 |
| 5,724,108 A | * | 3/1998 | Shibata .......... 349/62 |
| 6,064,521 A | * | 5/2000 | Burke .......... 359/443 |

FOREIGN PATENT DOCUMENTS

| | | |
|---|---|---|
| JP | A-1-234822 | 9/1989 |
| JP | A-3-75705 | 3/1991 |
| JP | A-7-49496 | 2/1995 |
| JP | A-8-146416 | 6/1996 |
| JP | 10-003079 | 1/1998 |
| WO | WO 95/17692 | 6/1995 |

OTHER PUBLICATIONS

Maurer, Robert et al., "7.6: Polarizing Color Filters Made From Cholesteric LC Silicones," SID 90 Digest, 1990, pp. 110–113.

* cited by examiner

Primary Examiner—Audrey Chang
Assistant Examiner—Craig Curtis
(74) Attorney, Agent, or Firm—Oliff & Berridge, PLC

(57) ABSTRACT

In a polarization splitting sheet (10) made of a transparent base material sheet (12), a coating layer (14) is provided on the rear surface of the base material sheet(12), this coating layer (14) having spherical beads (16) of a diameter in the range from 1 to 10 µm protruding from its surface, the spherical beads (16) of the coating layer (14) making contact with a smooth surface (18A) of a light-transmitting material (18). The half-value width of the diameter of the spherical beads (16) is made no greater than 1 µm, and the protrusion height of the spherical beads (16) from the coating layer (14) is made uniform.

17 Claims, 9 Drawing Sheets

POLARIZATION SPLITTING SHEET, OPTICAL SHEET LAMINATE, PLANAR LIGHT SOURCE APPARATUS, AND TRANSMISSION-TYPE DISPLAY APPARATUS

BACKGROUND OF THE INVENTION

1. Field of the Invention

The present invention relates to a polarization splitting sheet that passes light of one polarization and reflects light of another polarization, an optical sheet laminate of the aforementioned polarization splitting sheet and a prism sheet, a transmission-type liquid-crystal display apparatus, a planar light source apparatus that is used in illuminating a light transmission-type display element such as used in an advertising panel and which makes use of the aforementioned polarization splitting sheet or optical sheet laminate, and a transmission type display apparatus, such as a liquid-crystal display, which uses this planar light source apparatus.

2. Description of the Related Art

A liquid-crystal display apparatus that is used as a display in, for example, computers and television receivers modulates passes light through a polarizer and uses a liquid-crystal layer to modulate the polarized light obtained in doing so. For example, a typical liquid-crystal display 1 in the prior art is shown in FIG. 12, this being configured so that light that is emitted from a light source 3 of a backlighting apparatus 2 is incident to one end-surface 4A of an approximately planar light guide 4, this light exiting from the light exiting surface 4B, which is the upper surface as shown in this drawing, this light then being diffused by a diffusion sheet 5, after which it is collected by a prism sheet 6, so that it illuminates a liquid-crystal display panel 7 from the rear surface thereof.

In the above-noted backlighting apparatus 2, the light of the light source that is incident at the above-noted one end-surface of 4A is subjected to repeated total reflections within the light guide 4, and part of this light is reflected by the light exiting surface 4B and the light-diffusing element 4D that is disposed at the rear surface 4C, this light passing from the light exiting surface 4B through the diffusion sheet 5 and being shone in the direction of the liquid-crystal display panel 7. Light that is output from the above-noted rear surface 4C of the light guide 4, this being light directed downward in the drawing, is reflected by a reflecting sheet 8 that is disposed therebelow, so that this light is returned once again to the light guide 4.

The above-noted prism sheet is provided with a plurality of unit prisms 6A, these being triangular prisms (having a cross-sectional shape of a triangle or a triangle with a rounded top vertex) or unit lenses having a cross-section shape that is semicircular or semi-elliptical (not shown in the drawing), arranged so that the ridge lines thereof are mutually parallel.

The above-noted liquid-crystal display panel 7 is formed by a liquid-crystal cell 7A and polarizers 7B and 7C, the liquid-crystal cell 7A being configured as a liquid-crystal layer (such as a TN liquid crystal, STN liquid crystal, or a liquid crystal for an IPS or VA), this layer being held between two glass substrates or plastic substrates (neither shown in the drawing), and the above-noted polarizers 7B and 7C hold these substrates between them from the outsides (top and bottom in FIG. 12).

The above-noted liquid-crystal display panel 7, by means of an electric field that is applied to the liquid-crystal layer in the liquid-crystal cell 7A, modulates the condition of the light that passes therethrough, so that, by controlling the relationship of the light-transmitting axes of the polarizers 7B and 7C and the polarized light that passes through the liquid-crystal layer, the amount of light that passes through the liquid-crystal cell 7A is changed, so that information is displayed.

Another prior art liquid-crystal display apparatus 1A, which is shown in FIG. 13, is different from the liquid-crystal display apparatus 1 that is shown in FIG. 12 in that the direction of the prism sheet 6 in the backlighting apparatus 2A is reversed, so that, in contrast to the unit prisms 6A of FIG. 12 which face upward, the unit prisms face downward, and in that a light-scattering light guide 9 is used instead of the light guide 4.

The above-noted light-scattering light guide 9 is made, for example, of a light-transmitting resin which has a substance having a different refractive index at a minute interval therein, so that this itself acts so as to scatter light, thereby making the light-diffusing element 4D that is used in the liquid-crystal display apparatus 1 unnecessary.

Because other elements of the configuration of the above-noted liquid-crystal display apparatus 1A are the same as in the liquid-crystal display apparatus 1, they are assigned the same reference numerals and will not be explicitly described herein.

FIG. 14 shows yet another liquid-crystal display apparatus 1B, in which the backlighting apparatus 2B differs from the backlighting apparatus 2A in that it uses a light guide 9A that has an uneven surface height instead of the light-scattering light guide 9. The light guide 9A with the uneven surface height has the effect of providing minute height variations in the light exiting surface 4B of the transparent light guide 4, so that the light exiting surface 4C itself has the action of diffusing light, thereby changing the direction of travel of light within the light guide 4, and making the light-diffusing element 4D as described above unnecessary. It is also possible to provide the minute height variations in the surface that is on the opposite side of the light exiting surface 4B.

Because other elements of the configuration of the above-noted liquid-crystal display apparatus are the same as in the liquid-crystal display apparatus 1A of FIG. 13, they are assigned the same reference numerals and will not be explicitly described herein.

In all of the liquid-crystal display apparatuses 1, 1A, and 1B, the liquid-crystal cell 7A is held between the polarizers 7B and 7C and, because the polarizers 7B and 7C absorb approximately 50% of the incident light, the efficiency of light usage (transmissivity) is low, thereby making it necessary to shine more light from a light source onto the polarizer 7B, in order to achieve sufficient brightness at the surface of the liquid-crystal display panel 7.

If this is done, however, not only is there an increase in the power consumption of the light source 3 of the backlighting apparatus, but also heat from the light source 3 has an adverse affect on the liquid-crystal layer in the liquid-crystal cell 7A, this leading to such problems as an unclear display on the liquid-crystal display panel 7.

In contrast to the above situation, as disclosed in the Japanese Unexamined Patent Application publications H7-49496 and H8-146416, and in PCT (WO) H9-506985, and as shown in FIG. 15, there is an arrangement in which unpolarized light from a backlighting apparatus 2 (2A, 2B) is splitted into two circularly polarized lights which exhibit rotation directions that are mutually opposite, after which these are either converted to linear polarization, or wherein a polarization splitting sheet 9B is used to split light into two linearly polarized lights which are mutually perpendicular, one of the splitted polarized light components being caused to strike the liquid-crystal display panel 7, and the other polarized light component being returned to the backlighting apparatus 2 (2A, 2B), a reflective sheet (not shown in the drawing) or the like within the backlighting apparatus guiding the light once again to the polarization splitting sheet 9B side for re-use, thereby improving the efficiency of light usage.

In the disclosure in Japanese Unexamined Patent Application publication H7-49496, a polarization splitting sheet that is formed as a laminate of adjacent layers that having mutually different refractive indices is provided at the light exiting surface side of a planar light guide, unpolarized light from the light exiting surface being splitted into two polarized light components that are mutually perpendicular, one of these polarized light components being directed at the liquid-crystal cell, and the other polarized light component being returned to the light source side and caused to be reflected, after which it strikes the polarization splitting sheet once again.

In the disclosure in the Japanese Unexamined Patent Application publication H8-146416, a polarization splitting sheet made of a cholesteric liquid-crystal layer is disposed on the light exiting surface side of a planar light guide, unpolarized light from the light source being splitted into two circularly polarized light components having directions of optical rotation that are mutually opposite, one of these circularly polarized light components being converted to linearly polarized light by means of a quarter wave layer for phase-shifting, after which it is directed so as to strike the liquid-crystal cell, and the other of the circularly polarized light components being returned to the light source side, after which it strikes the polarization splitting sheet once again.

In the disclosure in Japanese Unexamined Patent Application publication PCT (WO) H9-506985, a polarization splitting sheet made of a multilayer drawn film is provided on the light exiting surface side of the backlighting apparatus, the unpolarized light from the light exiting surface being splitted into two polarized light components which are mutually perpendicular, one of these polarized light components being output in the direction of the liquid-crystal cell, and the other polarized light component being returned to the backlighting apparatus and reflected, after which it strikes the polarization splitting sheet once again.

In the disclosure in the Japanese Unexamined Patent Application publication H7-49496, because the light reflected from the polarization splitting sheet is recycled, compared with a liquid-crystal display apparatus in which a light-absorbing polarizer is used, there is a great improvement in the efficiency of light usage (the theoretical maximum value being doubled). However, interference fringes are observed as a repeated pattern of light and dark light between the light-splitting sheet and other optical materials that are adjacent thereto, so that if this light is used to illuminate the liquid-crystal display panel, the image that is formed by the various pixels will be disturbed, thereby causing the problem of a prominent worsening in readability.

This prominent worsening of readability causes a reduction in the quality of the display that is far greater than in a liquid-crystal display apparatus of the past which uses a light-absorbing polarizer and does not make use of a polarization splitting sheet. The reason for this is that, in contrast to the optical reflectivity of a light-absorbing polarizer in the past, which was several percent or lower, the optical reflectivity of a polarization splitting sheet such as described above is approximately 50%.

That is, because a light ray that is reflected from the polarization splitting sheet is recycled to the light source side once again, the amount of light that forms interference between the polarization splitting sheet and other optical materials (such as a prism sheet, a diffusion sheet, a light guide, or a reflective sheet) is approximately 10 times that of the case in which a light-absorbing polarizer is used.

For example, if the reflectivity of a light-absorbing polarizer in the past is 4% and the reflectivity of a polarization splitting sheet is 40%, the amount of light that forms interference between the polarization splitting sheet and other optical materials is 10 times that of the case in which a light-absorbing polarizer is used.

Because the extinction ratio of the polarization splitting sheet 9B is not as great as the extinction ratio of a light-absorbing polarizer of the past, as shown by the double-dot-dash line in FIG. 15, a light-absorbing type of polarizer 9C is sometimes inserted between the polarization splitting sheet 9B and the liquid-crystal display panel 7, in order to improve the extinction ratio. If this is done, however, it was learned that interference fringes occur between the polarization splitting sheet 9B and the polarizer 9C. The reason for this is that, as described earlier, the optical reflectivity of the polarization splitting sheet 9 is very high, this being approximately 50%.

The above-noted interference phenomenon occurs not only with light from the backlighting apparatus side, but can also be caused by external light that strikes the liquid-crystal display panel. That is, external light that strikes the liquid-crystal display panel is reflected by the polarization splitting sheet, interference fringes occurring between this and the light-absorbing polarizer that is disposed nearby.

In contrast to the above-noted situation, for example as shown in the liquid-crystal display apparatus of the Japanese Unexamined Patent Application publication H1-234822, it can be envisioned that a light-scattering surface be formed at the lower surface of the polarizer by forming a light-scattering layer on the above-noted polarization splitting sheet, thereby suppressing the generation of interference fringes. In this case as well, however, there are still the following described three problems.

(1) Loss of Light Intensity

When a light-diffusing layer is provided in a polarization splitting sheet on a backlighting apparatus, on a liquid-crystal display panel, or on both, because light that strikes the polarization splitting sheet is diffused by the light-diffusion layer, the direction of travel of the light beams is scattered into various directions, and the intensity that is observed near the normal direction with respect to the polarization splitting sheet is greatly reduced.

(2) The Occurrence of Flaws

When a light-diffusing layer is provided in a polarization splitting sheet on a backlighting apparatus, on a liquid-crystal display panel, or on both, the raised parts of the surface of the light-diffusion layer which has uneven height cause damage to the prisms, for example, on the prism sheet surface with which they come into contact, these flaws making it impossible to obtain an overall planar light output.

In the case in particular in which the vertex of the prisms of the prism sheet is pointed, with an angle of 100° or smaller, force from the raised parts of the uneven surface of the light-diffusion layer is concentrated on the ends (vertices) of the prisms, so that the prisms are particularly susceptible to damage.

(3) Reduction in Degree of Polarization

If a light-diffusion layer is provided on the liquid-crystal display panel side of a polarization splitting sheet, because light that passes through the polarization splitting sheet is diffused by the light-diffusion layer, the direction of the polarization thereof is disturbed, so that the amount of light that was absorbed in a light-absorbing polarizer in the past increases, this representing a commensurate reduction in the efficiency of light usage.

SUMMARY OF THE INVENTION

Accordingly, it is an object of the present invention, in consideration of the drawbacks in the prior art as described above, to provide a polarization splitting sheet, an optical sheet laminate, a planar light source, and a transmission-type display apparatus which, without an accompanying loss of intensity, the occurrence of flaws, and a reduction in the degree of polarization, suppresses interference fringes and improves the efficiency of light usage.

The present invention is based on the knowledge that, by selecting the bead diameter of the light-transmitting beads in a coating layer that is used as a light-diffusion layer in a polarization splitting sheet, it is possible to solve the above-noted problems with regard to a reduction in light intensity and a reduction in the degree of polarization, and further that, by selecting the distribution of the light-transmitting beads, it is possible to solve the problem of flaws occurring.

To achieve the above-noted object, a polarization splitting sheet according to the present invention, as recited in claim 1, is formed by a light-transmitting base material that achieves the above-noted object by passing one polarized light component of the incident light and reflecting the other polarized component, one side of this sheet being covered by a coating layer that includes light-transmitting beads having a bead diameter of 1 to 10 $\mu$m.

At least part of the light-transmitting beads in the above-noted coating layer can be spherical light-transmitting beads having a half-value width of 1 $\mu$m or smaller.

The above-noted polarization splitting sheet can be a laminate of three or more layers mutually adjacent in the thickness direction and having mutually different refractive indices, so that one polarization of the incident P polarization and S polarization light is transmitted, while the other polarization is reflected, so as to separate the two polarizations.

Additionally, the above-noted polarization splitting sheet can be formed so as to include an optical circulation selection layer, made of a cholesteric liquid-crystal layer, so that this cholesteric liquid-crystal layer splits the incident light into one circular polarized light component and a circular polarized light component that is of opposite direction thereto.

Additionally, the above-noted polarization splitting sheet can be formed so as to include a quarter wave layer.

Additionally, the above-noted polarization splitting sheet can have a planar structure of three or more layers, each layer being birefringent, the difference in refractive indices of layers that are mutually adjacent in the thickness direction with respect to one of two light components that have oscillation directions that are mutually perpendicular within a plane being different than the difference in refractive indices of layers mutually adjacent in the thickness direction with respect to the other light component.

To achieve the above-noted object, an optical sheet laminate according to the present invention, as recited in claim 6, has a polarization splitting sheet as described above, and a prism sheet which includes unit prisms or unit lenses laminated with this polarization splitting sheet, the coating layer of the polarization splitting sheet being in physical contact with unit prisms or unit lenses of the adjacently laminated prism sheet.

It is possible to make the vertex angle at the end of the unit prisms or unit lenses that make contact with the polarization splitting sheet 100° or smaller.

To achieve the above-noted object, a planar light source apparatus according to the present invention, as recited in claim 8, has a light guide that is in the form of a plate, made of a light-transmitting material, light which is guided into the guide from at least one end surface of this light guide exiting from the light exiting surface thereof, which is the other surface of the light guide, a light source that causes light to strike the above-noted at least one surface of the light guide, and a polarization splitting sheet or an optical sheet laminate such as described above, that is provided on the above-noted light exiting surface of the light guide, and that causes light that is output from the above-noted light exiting surface to strike the above-noted coating layer.

To achieve the above-noted object, another planar light source apparatus according to the present invention, as recited in claim 9, has a light-diffusing sheet, a light source that shines light onto the light-diffusing sheet, a reflector, which is located on the opposite side of the light source from the light-diffusing sheet, and which reflects light from the light source in the direction of the light-diffusing sheet, and a polarization splitting sheet or an optical sheet laminate such as described above, which is disposed so that light that is emitted from the above-noted light-diffusing sheet strikes the above-noted coating layer.

To achieve the above-noted object, a light transmission-type display apparatus according to the present invention, as recited in claim 10, has a planar transmission-type display element, and a planar light source apparatus such as described above, which is provided on the rear surface of this light transmission-type display element, and which illuminates the light transmission-type display element from the rear thereof, with the light that it emits.

In the present invention, by including light-transmitting beads having a bead diameter in the range of 1 to 10 $\mu$m in the coating layer that is formed on the surface of the polarization splitting sheet, it is possible to avoid interference with respect to adjacent optical material, and to solve the problems of a reduction in intensity and a reduction in the degree of polarization. By making the half-value width of the bead diameter distribution of these beads 1 $\mu$m or smaller, it is possible to prevent damage flaws occurring because of stress concentrations.

DESCRIPTION OF THE PREFERRED EMBODIMENTS

Embodiments of the present invention are described below in detail, with reference being made to the relevant accompanying drawings.

Figure 1:
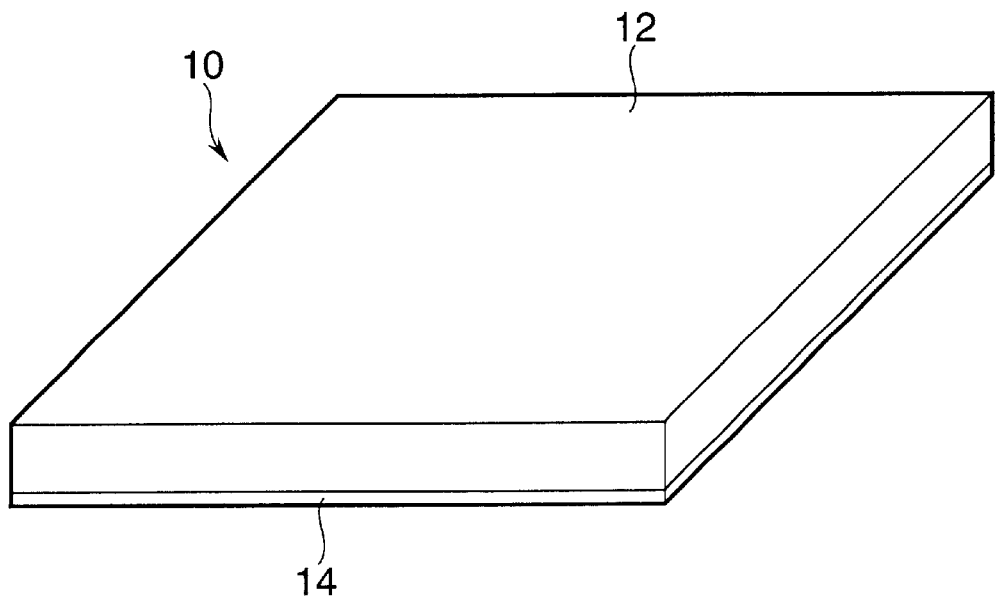
FIG. 1 is an enlarged perspective view of one part of a polarization splitting sheet as an embodiment of the present invention.
Figure 2:
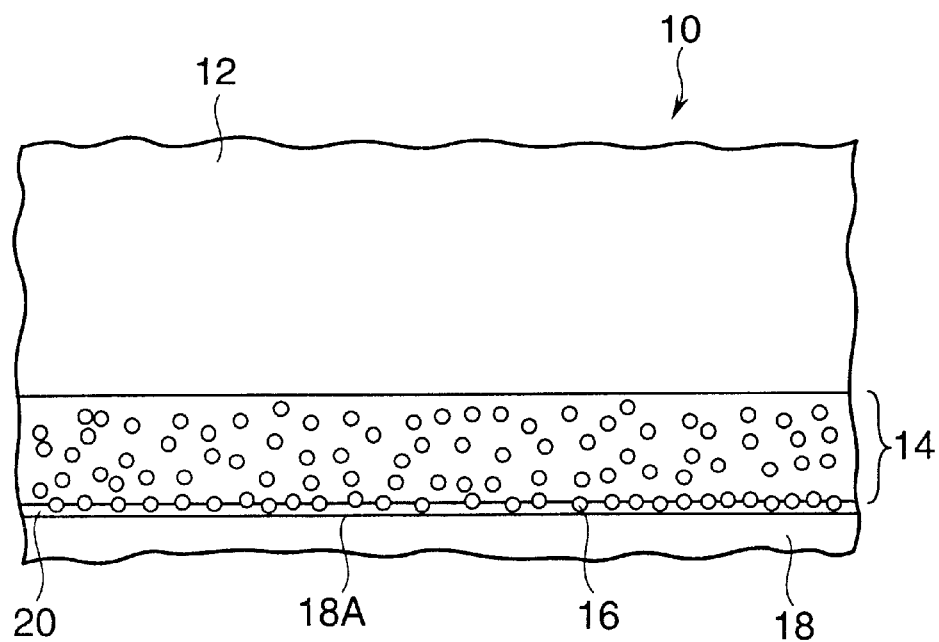
FIG. 2 is a further enlarged cross-sectional view of a part of the polarization splitting sheet shown in FIG. 1.

As shown in FIG. 1 and FIG. 2, a polarization splitting sheet 10 according to the present invention is formed by a transparent base material sheet 12 onto one surface of which (the lower surface as shown in FIG. 1 and FIG. 2) is provided a coating layer 14, onto which coating layer 14 are provided spherical beads 16 made of a light-transmitting material, these beads having a diameter in the range from 1 to 10 $\mu$m, and a diameter distribution with a half-value width of 1 $\mu$m or smaller.

On the surface of the coating layer 14, part of the spherical beads 16 protrude in a random two-dimensional distribution, thereby forming multilevel hill-shaped protrusions.

By forming the surface of the polarization splitting sheet 10 with the coating layer 14, which includes light-transmitting spherical beads 16, and establishing the diameter of these light-transmitting spherical beads 16 in the range from 1 to 10 $\mu$m, it is possible to suppress the disturbance of the direction of travel of light beam by a light-diffusing layer, and also possible to suppress the disturbance of the direction of light polarization by a light-diffusing layer.

When the above-noted polarization splitting sheet 10 as shown in FIG. 2, so that the coating layer 14 thereof is in physical contact with or proximity to a smooth surface 18A of another light-transmitting material 18, this being, for example, a smooth surface of a light guide, a smooth surface of a diffusing sheet, or a smooth surface of another prism sheet, in the prior art, as described above, interference fringes occur. With the polarization splitting sheet 10 of the present invention, however, as shown in FIG. 2, because the spherical beads 16 that protrude from the coating layer 14 make contact with the smooth surface 18A of the light-transmitting material 18, such as a light guide, a space 20 of 1 to 10 $\mu$m inevitably occurs between the smooth surface 18A and the surface of the coating layer 14.

For this reason, even if there is light that is incident at the smooth surface 18A of the light-transmitting material 18, the light-diffusing action of the spherical beads 16 suppress the occurrence of interference fringes.

As described above, because the spherical beads 16 have a diameter distribution half-value width of 1 $\mu$m or smaller, the variation in the protrusion height of the spherical beads 16 from the surface of the coating layer 14 is no greater than 1 $\mu$m.

Figure 3:
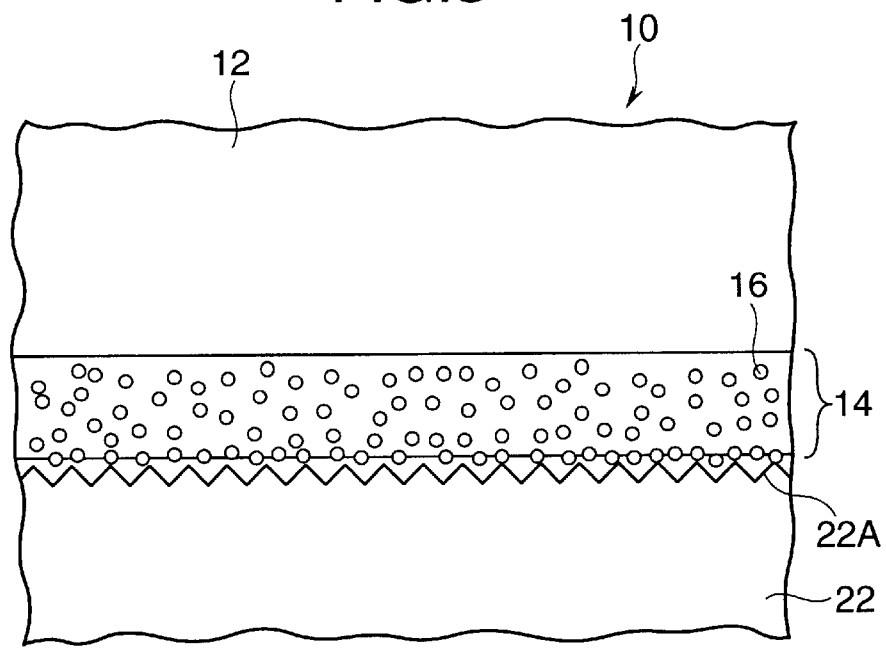
FIG. 3 is a cross-sectional view that shows the condition of lamination of the polarization splitting sheet shown in FIG. 1 with a prism sheet.

Therefore, even if the spherical beads 16, as shown in FIG. 3, come into contact with the edges of the prism parts 22A of another prism sheet 22 or, as shown in FIG. 2, come into contact with the smooth surface 18A of another light-transmitting material 18, because the condition of contact is uniform, there is no concentration of loading caused by a spherical bead 16 that protrudes greatly, thereby preventing damage, for example, to the prism parts 22A of the prism sheet 22. In particular in the case in which the vertex angle of the prism parts 22A as sharp as 100° or smaller, this effect is prominent when during handling, in which concentrated force from the spherical beads 16 acts on the ends of the prism parts, this tending to cause damage thereto.

The reason the diameter of the spherical beads 16 was made 1 $\mu$m or greater was that, if this diameter is made less than 1 $\mu$m, this approaches the wavelength of the light source (visible light), causing coloration. Additionally, if the bead diameter is made less than 1 $\mu$m, mass production of light-transmitting beads (for example, beads made of and acrylic resin) becomes difficult as does the achievement of a uniform distribution of the spherical beads in a binder (to be described below) that forms the coating layer 14.

The reason for making the diameter of the spherical beads 16 no greater than 10 $\mu$m is to avoid the great disturbance to the direction of travel of light incident to the polarization splitting sheet 10 that would occur if the diameter is made greater than 10 $\mu$m.

As described above, the spherical beads 16 are randomly dispersed in two directions on the surface of the coating film 14, and do not exhibit a periodic arrangement.

For example, in the case in which the polarization splitting sheet 10 such as described above is provided on the light exiting surface of the backlighting apparatus of a color liquid-crystal display apparatus, even if the spherical beads 16 are arranged periodically in the coating layer 14, because of overlapping with the arrangement period of pixels in the liquid-crystal display apparatus, there is a danger that Moire fringes would occur. With the polarization splitting sheet 10 of the present invention, however, because the spherical beads 16 are randomly arranged in two dimensions, this occurrence of Moiré fringes is prevented.

The material used as the transparent material for forming the spherical beads 16 is a polyester resin having good transparency, such as polyethylene terephthalate (PET) or polybutylene terephthalate, an acrylic resin such as polymethyl acrylate, a thermoplastic resin such as polycarbonate resin, polystyrene resin, or polymethyl pentene resin, an oligomer and/or an acrylic monomer such as polyester acrylate, urethane acrylate, or epoxy acrylate, which can be cured by means of either ionizing radiation or a resin which can be cured either ultraviolet light or electromagnetic radiation. When such a resin is used, a resin having a refractive index in the approximate range from 1.4 to 1.6 is selected. As long as the material is transparent, materials other than resin, such as glass or ceramic, can also be used.

The coating layer 14, which is formed by dispersing spherical beads 16 as described above into a transparent binder, is applied by either spraying or rolling, either some or all of the spherical beads 16 protruding from the surface of the thus applied film of the coating layer 14.

Figure 4A:
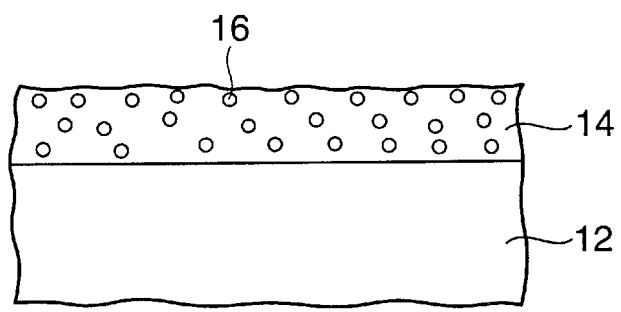
FIG. 4 is a cross-sectional view that shows the process of forming the coating layer on the polarization splitting sheet that is shown in FIG. 1.
Figure 4B:
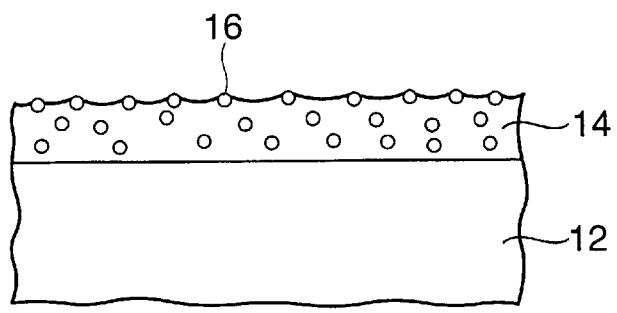

When the above is done, in the coating layer 14, which is formed by applying a paint formed by dispersing the spherical beads 16 in a transparent binder, the spherical beads 16 are sunken into the transparent binder, as shown in FIG. 4(A). When the applied film dries and shrinks, however, some of the spherical beads 16 protrude from the surface of the coating layer 14, as shown in FIG. 4(B).

A transparent material such as an acrylic, polyethelene, polyester, or vinyl polymer is used as a binding resin in forming the coating layer 14 and, from the standpoint of not disturbing the light polarization and not reducing the light intensity, it is particularly desirable that the ratio between the refractive index of the material that is used to form the spherical beads 16 and the refractive index of the binder resin be in the range from 0.9 to 1.1, and additionally desirable from the standpoint of not disturbing the light polarization and not reducing the light intensity that the concentration of transparent beads be in the range from 2 to 15% with respect to the binder component of the coating layer 14.

It is further desirable that the thickness of the coating layer 14, exclusive of the protrusion height of the spherical beads 16, be in the range from 1 to 20 $\mu$m. This is because making the coating layer 14 thickness less than 1 $\mu$m makes it impossible to hold the spherical beads 16 to the rear surface of the transparent base sheet 12, and making the coating layer 14 thickness 20 $\mu$m or greater reduces the transmissivity so that, as described above, there is a significant loss in the inherent polarization splitting action of the polarization splitting sheet.

Figure 5:
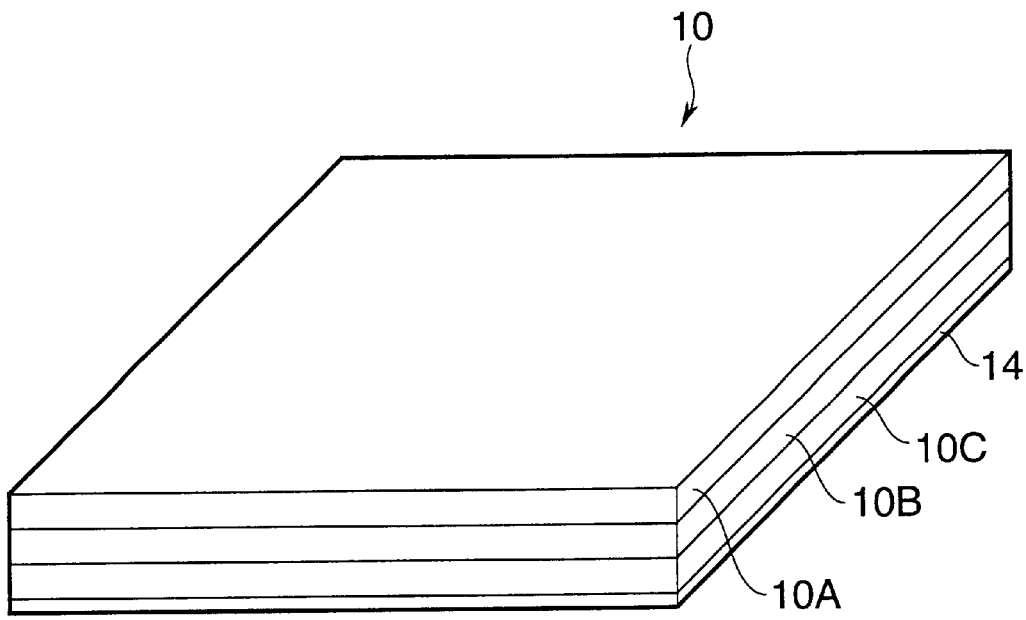
FIG. 5 is a further enlarged perspective view that shows the polarization splitting sheet shown in FIG. 1.

The above-noted polarization splitting sheet 10, as shown in FIG. 5, is formed by the lamination of three light-transmitting sheets 10A, 10B and 10C, these having mutually different refractive indices. It should be noted that, while the coating layer 14 that is shown in FIG. 5 is provided on the light incidence surface, it can also be provided on the light exiting surface, or on both surfaces.

As long as a light-transmitting material is used, there is no particular restriction placed on the material of the above-noted light-transmitting sheets 10A through 10C, and it is possible to use a material such as disclosed in the Japanese Unexamined Patent Application publication H7-49496, a polyester resin such as PET, an acrylic resin such as PC or PMMA, TAC (tri-acetyl cellulose), glass, silica, or ITO (indium tin oxide), or the like.

As described above, when a light beam passes through the light-transmitting sheets 10A through 10C, which have mutually different refractive indices, a phenomenon of polarization (polarization split) of the transmitted light and the reflected light occurs.

While this polarization split effect differs, depending upon the angle of incidence of light with respect to the polarization splitting sheet 10, if this angle of incidence is the Brewster angle, that is, if the angle of incidence is such that there is an angle of 90° between the refracted light and the reflected light at the above-noted boundary, the polarization split effect will be maximum.

Taking the case in which the angle of light incidence is the Brewster angle, if a single light-transmitting sheet in air (refractive index n=1) with a refractive index of n'>n is used, the intensity ratio between S polarization light in the reflected light and P polarization light in the transmitted light is given as Ts/Tp={2n'/(1+n'$^2$)}.

To achieve a stronger polarization effect, it is desirable to use at least three or even five or more light-transmitting sheets.

When light strikes a polarization splitting sheet 10 such as described above, the P polarization light in the transmitted light increases and the S polarization light in the reflected light increases.

Figure 6:
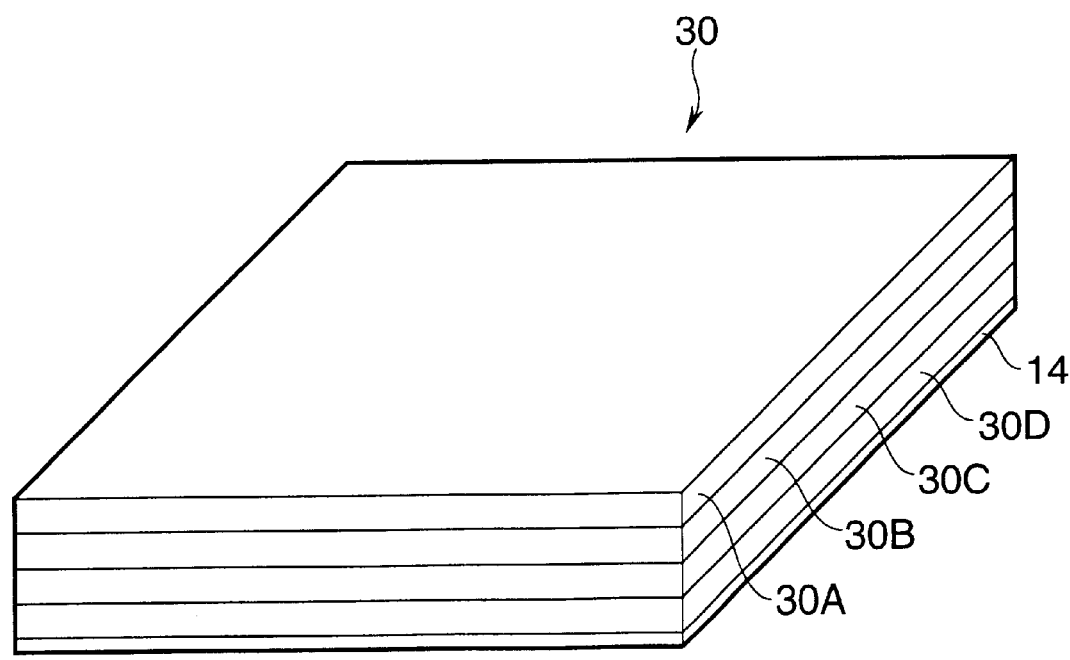
FIG. 6 is a perspective view that shows the second embodiment of a polarization splitting sheet according to the present invention.

Turning to FIG. 6, another embodiment of a polarization splitting sheet according to the present invention is described below.

This polarization splitting sheet 30 is formed, by lamination of, from the light incidence surface side, a PET layer 30D, a cholesteric liquid-crystal layer 30C, a quarter wave layer 30B for phase-shifting, and a TAC layer 30A. Although the coating layer 14 shown in FIG. 6 is provided on the light incidence side, it should be noted that this can be provided on the light exiting side or on both sides.

In the above-noted arrangement, the cholesteric liquid-crystal layer 30C serves the function of splitting from the incident light, a optically circulated light component in with one circulation direction, and an optically circulation light component with a circulation direction that is opposite thereto.

In general, the above-noted circular selection characteristic is exhibited by a cholesteric liquid crystal based on the physical arrangement of molecules thereof. In the case of incident light of planar arrangement on a helical axis, the light will be splitted into a circularly polarized light component with right circulation and a circularly polarized light component with left circulation, one being transmitted and the other being reflected.

This phenomenon is known as circular dichroism, and if the circulation direction of the circularly polarized light is selected appropriately with respect to the incident light, selective scattering will occur of circularly polarized light with a circular direction that is the same as the helical axis direction of the cholesteric liquid crystal.

In the above case, the maximum scattering of the circulated light occurs at a wavelength of λ0, which is given by the Equation (1).

$$\lambda 0 = n_{av} \cdot p \qquad (1)$$

In the above equation, p is the helical pitch, and nav is the average refractive index within a plane that is perpendicular to the helical axis.

Under these conditions, the wavelength bandwidth Δλ of the reflected light is given by Equation (2).

$$\Delta\lambda = n \cdot p \qquad (2)$$

In the above relationship, Δn=n (∥)−n(perpendicular), n(∥) is the maximum refractive index within a plane that is perpendicular to the helical axis, and n (perpendicular) is the maximum refractive index within a plane that is parallel to the helical axis.

The wavelength λφ of selectively scattered light that is incident at an inclination with respect to a planarly arranged helical axis is known to be shifted towards the short-wavelength side in comparison with λ0.

It is desirable to use, as a cholesteric liquid material, a material such as disclosed in the Japanese Unexamined Patent Application publication H8-146416, or a chiral nematic liquid-crystal compound formed by a Schiff's base, an azo compound, an ester, or a biphenyl or other nematic liquid-crystal compound in which an optically active 2-methyl butyl group, a 2-methyl butoxyl group, or 4-methyl hexyl group is coupled to the end group.

A polymer liquid crystal is generally a polymer into which a mesogenic group that exhibits liquid crystal properties is introduced in the main chain or side chain position, or into both the main chain and side chain positions, and a polymer cholesteric liquid crystal is also obtained by introducing a cholesteric group into, for example, a side chain position.

The polarization effect of a cholesteric liquid crystal is such that the cholesteric liquid crystal passes a circular polarized light component of one direction (right or left circulation) and reflects a circular polarized light component of the other direction.

Because linearly polarized light is usually used for backlighting in a liquid-crystal display apparatus, it is desirable, in addition to the cholesteric liquid crystal layer 30C noted above, to use also a quarter wave layer 30B for phase-shifting.

The action of the cholesteric liquid crystal 30C and the quarter wave layer 30B is disclosed, for example, in *SID 90 Digest,* pp. 110–113, "Polarizing Color Filters Made from Cholesteric LC Silicone."

The angle of light incidence at which the polarization split effect of the cholesteric liquid-crystal layer 30C is maximum is dependent upon the orientation direction of the cholesteric liquid crystal, and it is desirable that the helical axis be approximately coincident with the normal direction with respect to the polarization splitting sheet 30. Orientation is established by using a known method such as the rubbing method or the method of using polarized UV light.

When light strikes a polarization splitting sheet 30 such as describe above, at the cholesteric liquid-crystal layer 30C, one circularly polarized light component (right or left circulation) is passed, this transmitted circularly polarized light component being transformed to linear polarization by the quarter wave layer 30B, and passing through the TAC layer 30A, after which it exits in the upper surface (light exiting surface) shown in FIG. 6.

Yet another embodiment of a polarization splitting sheet according to the present invention is described below, with reference being made to FIG. 7.

Figure 7:
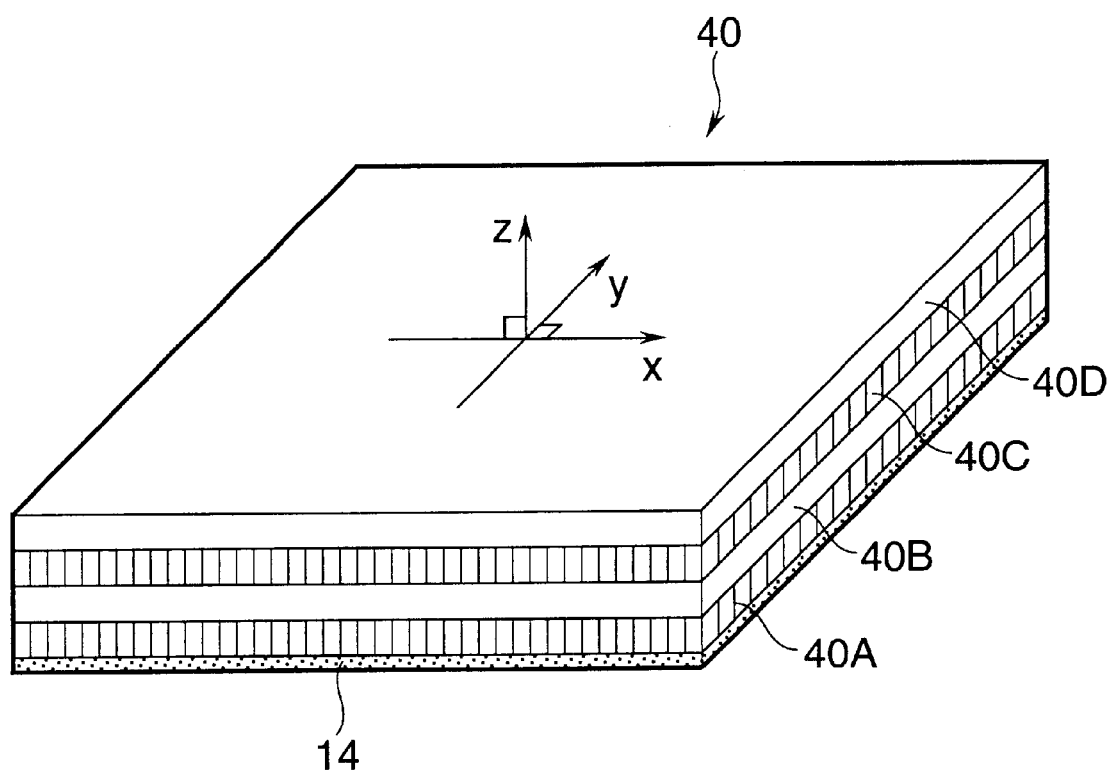
FIG. 7 is a perspective view that shows the third embodiment of a polarization splitting sheet according to the present invention.

The polarization splitting sheet 40 that is shown in FIG. 7 is formed as a multilayer planar lamination of four layers that have mutually different refractive indices, the coating layer 14 being provided in this case on the light incidence side, although it can also be provided on the light exiting side or on both sides.

In the above-noted polarization splitting sheet 40, the difference between the refractive indices of layers that are mutually adjacent in the thickness direction with respect to one of two light components that have oscillation directions that are mutually perpendicular within a plane is made substantially zero, and the difference between the refractive indices of layers that are mutually adjacent in the thickness direction with respect to the other of the above-noted two light components is made non-zero, so that the above-noted one light component is passed, while the other light component is reflected.

Each of the birefringent layers 40A through 40D that form the above-noted polarization splitting sheet 40 can be obtained by, for example, drawing a material such as disclosed in the Japanese Unexamined Patent Application publication H3-75705, this being a polycarbonate resin, a polyester resin, a polyvinyl alcohol resin, an acetyl cellulose resin or other substance that exhibits intraplanar birefringence (refractive index anisotropy). In addition, as disclosed in PCT (WO) H9-506985, it is also possible to form these from drawn PEN.

More specifically, as shown in FIG. 7, the polarization splitting sheet 40 is formed by the four birefringent layers 40A through 40D. If light oscillating within the plan in the two mutually perpendicular directions indicated by the symbols X and Y in FIG. 7 is established, the refractive indices of each of the birefringent layers 40A through 40D are as follows.

For example, because the refractive indices of the birefringent layers 40A, 40B, 40C, and 40D with respect to a light beam that oscillates in the x-axis direction is substantially the same as nx, the difference in refractive indices in the x-axis direction of adjacent layers is $\Delta nx$ (=|nx−nx|), this being substantially zero.

Because the refractive indices of the birefringent layers 40A and 40C with respect to a light beam oscillating in the y-axis direction are both ny1, and the refractive indices of the birefringent layers 40B and 40D with respect to a light beam oscillating in the y-axis direction are both ny2 (where ny1≠ny2), the difference in refractive indices in the y-axis direction of adjacent layers is $\Delta ny$ (=|ny1−ny2|), this being substantially zero.

By virtue of the above relationships, the condition is established in which the difference in refractive indices $\Delta nx$ of adjacent layers in the x-axis direction and the difference in refractive indices $\Delta ny$ in the y-axis direction are substantially different (that is, nx≠ny).

By using a polarization splitting element that is formed by a planar multilayer structure in which the difference in refractive indices of adjacent layers with respect to light of one direction of two light components which oscillate in directions that are mutually perpendicular within the plane is different from the difference in refractive indices of adjacent layers with respect to light of the other direction of the two light components, it is possible to achieve polarization split.

That is, the reflection of light that oscillates in a direction (for example, the y-axis direction) that has the larger difference in refractive indices between adjacent layers is larger than the light that oscillates in the direction (for example, the x-axis direction) that has a smaller difference in refractive indices between adjacent layers, and the transmission of light that oscillates in a direction (for example, the x-axis direction) that has the smaller difference in refractive indices between adjacent layers is larger than the transmission of the light that oscillates in the direction (for example the y-axis direction) that has a larger difference in refractive indices between adjacent layers.

In a more preferred embodiment, the smaller difference in refractive indices is substantially zero, in which case light that oscillates in the direction that gives the smaller difference in refractive indices is transmitted without reflection.

That is, in this preferred embodiment, a polarization splitting element is used-that has a planar multilayer structure, wherein with respect to two light components that oscillate in directions that are mutually perpendicular with the plane, the difference in refractive indices between adjacent layers with respect to light in one direction (for example, the x-axis direction) is substantially zero, and the difference in refractive indices between adjacent layers with respect to the other light component is different. If such a polarization splitting element is used, in a more preferred it is possible to separate the polarizations (for example, by passing light that oscillates in the x-axis direction and reflecting light that oscillates in the y-axis direction). Naturally, the larger is the difference value of the larger refractive index, the higher will be the degree of polarization split.

The reason for this is that, in the case of the above-cited example, as seen from the light that oscillates in the x-axis direction, because the refractive index within the planar multilayer polarization splitting element is substantially uniform, all that occurs is a very small surface reflection at the point of incidence to and point of exit of light from the planar multilayer polarization splitting element.

However, as seen from the light that oscillates in the y-axis direction, because the refractive indices between adjacent layers of the planar multilayer polarization splitting element are different, reflections occur not only at the point of incidence to and point of exit of light from the planar multilayer polarization splitting element, but also at the surfaces that are the boundaries between the various layers thereof. Thus, the more layers the polarization splitting element has, the more surface (boundary) reflections occur, and the greater is the reflection of light that oscillates in the y-axis direction.

It should be noted that, while the polarization splitting sheet 40 shown in FIG. 7 is a four-layer structure, there is no particular restriction to this structure, it being preferable to have at least 3 layers and more preferable to have 5 or more layers. Additionally, the greater are the number of birefringent layer that form the polarization splitting sheet, the greater are the above-noted surface reflections that occur, making it possible to better reflect light of the opposite oscillation direction. In practice, there are cases in which there are up to 100 layers.

The angle of incidence of light for which the polarization split effect is greatest in the polarization splitting sheet 40 is the normal line, perpendicular with respect to the surface of the polarization splitting sheet 40.

It is possible to use linearly polarized light components that have oscillation directions that are mutually perpendicular as a method of measuring the polarization split condition.

Figure 8A:
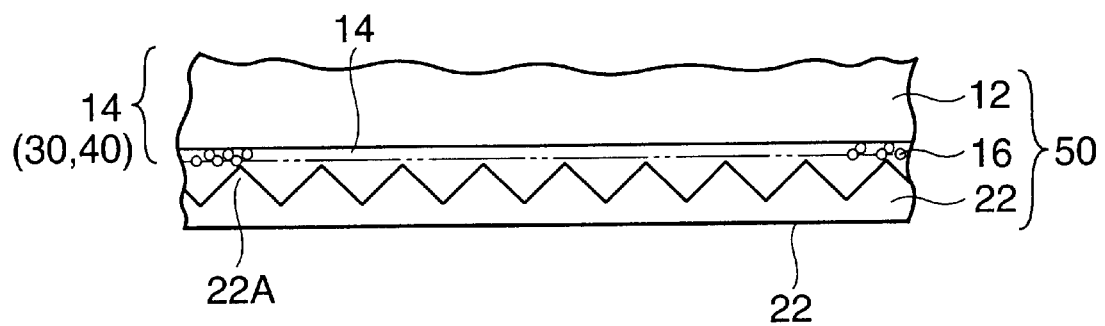
FIG. 8 is an enlarged cross-sectional view that shows an embodiment of an optical sheet laminate according to the present invention.

FIG. 8(A) shows an embodiment of an optical sheet laminate 50 according to the present invention. This optical sheet laminate 50 is formed by the lamination of a prism sheet 22 beneath a polarization splitting sheet 10, 30, or 40, the coating layer 14 on the polarization splitting sheet 10, 30, or 40 being disposed so as to come into physical contact with the vertices of the prism parts 22A that are on the upper surface of the prism sheet 22 that is beneath the coating layer 14.

In this optical sheet laminate 50, as described above, because the half-value width of the diameter distribution of the spherical beads 16 is 1 µm or smaller, the dispersion in the protrusion height of the spherical beads 16 from the surface of the coating layer 14 is no greater than 1 µm.

Therefore, even if the spherical beads 16 come into contact with the edges of the prism parts 22A of the prism sheet, because the condition of contact is uniform, there is no concentration of loading caused by a spherical bead 16 that protrudes greatly, thereby preventing damage, for example, to the prism parts 22A of the prism sheet 22.

Figure 8B:
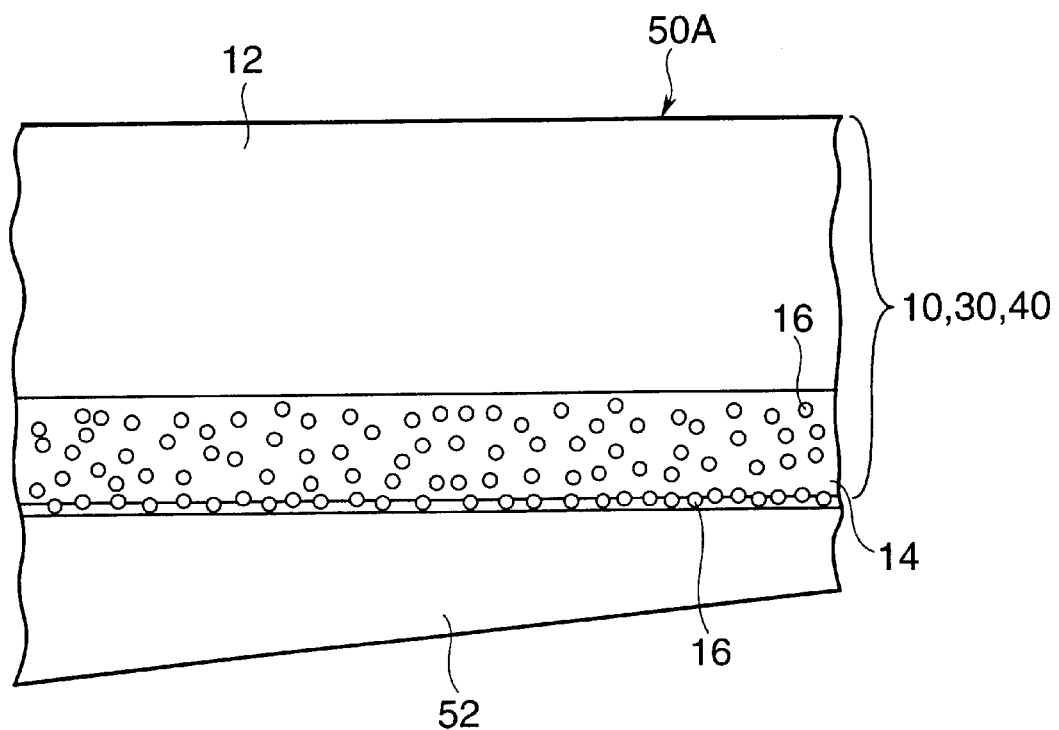

It is also possible in the same manner to prevent damage to a light guide 52 in the case of an optical sheet laminate 50A, as shown in FIG. 8(B), wherein the coating layer 14 of the polarization splitting sheet 10, 30, or 40 is disposed so as to be in direct contact with the light guide 52.

Next, an embodiment of a planar light source apparatus 60 according to the present invention will be described, with reference being made to FIG. 9.

Figure 9:
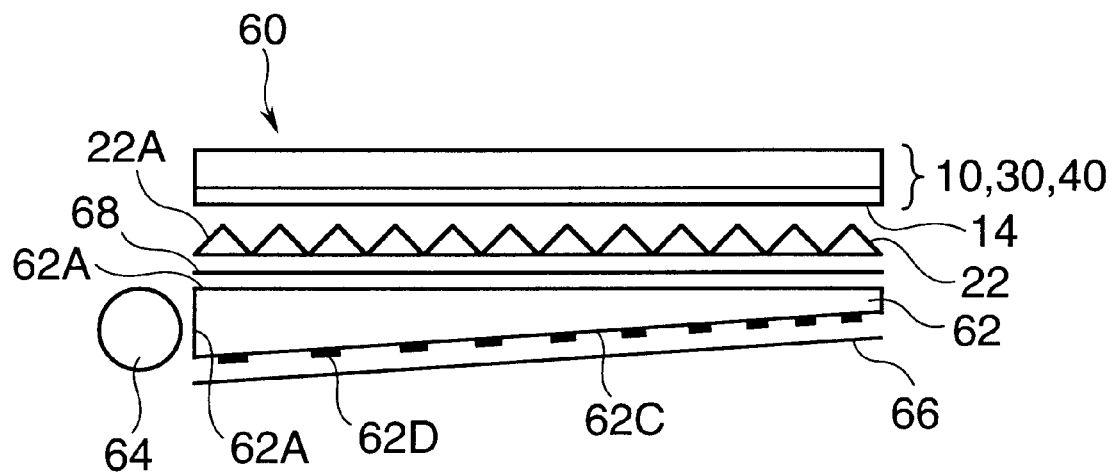
FIG. 9 is a cross-sectional view that shows a schematic representation of the main parts of a planar light source apparatus that uses a polarization splitting sheet that is an embodiment of the present invention.

The planar light source apparatus 60 is provided on the light exiting surface of the polarization splitting sheet 10, 30, or 40, this being in the form of a sheet-like element made of a light-transmitting material, having a light guide 62, which outputs light incident thereto at a left side edge surface 62A thereof as shown in FIG. 9 from a light exiting surface 62B on the top thereof, a linear light source 64 that is disposed so as to be parallel to the above-noted side edge surface 62A and that causes light to strike and enter the light guide 62 from the side edge surface 62A, and a light-reflecting sheet 66, which is disposed so as to cover a surface 62C opposite to the light exiting surface 62B, and side edge surfaces of the above-noted light guide 62 other than thereto, and the left side edge surface 62A, and which disturbs the polarization condition and reflects light that exits the above-noted surface, thereby returning it to within the light guide 62. In FIG. 9, the reference numeral 62D denotes a light-diffusing element.

The coating layer 14 of the above-noted polarization splitting sheet 10, 30, or 40 is disposed so that the prism sheet 22 and a diffusion sheet 68 are between it and the above-noted light exiting surface 62B of the light guide 62, and so that it makes physical contact with the prism parts 22A of the prism sheet 22. The light guide 62 is usually housed within an enclosure box (not shown in the drawing), with the light exiting surface 62B serving as a window thereof.

While in the above-noted planar light source apparatus 60 the coating layer 14 of the polarization splitting sheet 10, 30, or 40 is in direct physical contact with the vertices of the prism parts 22A of the prism sheet, there is no particular restriction to this arrangement in the present invention, and it is possible, for example, to eliminate the prism sheet. In order to achieve a high light intensity, however, it is preferable to use the prism sheet 22, in which case if the half-value width of the distribution of diameters of the spherical beads 16 is made 1 µm or smaller, there is a particular reduction in the damage to the prism ends caused by protrusions, including the spherical beads 16, when the prism sheet 22 is put in place.

Figure 13:
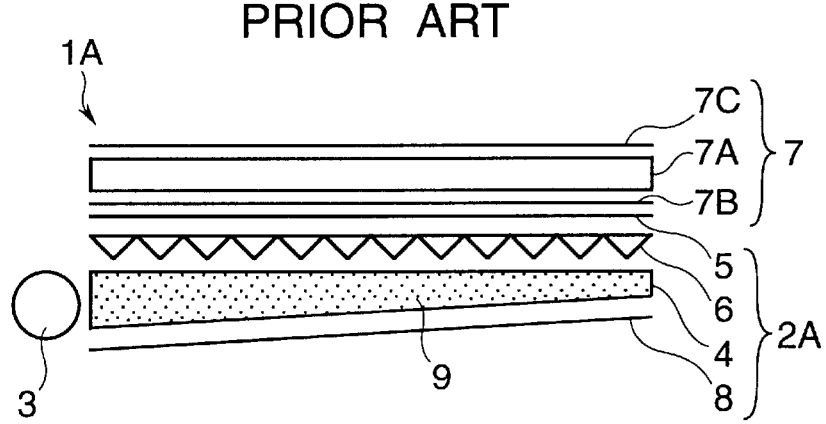
FIG. 13 is a simplified side view that shows another liquid-crystal display apparatus according to the prior art.
Figure 14:
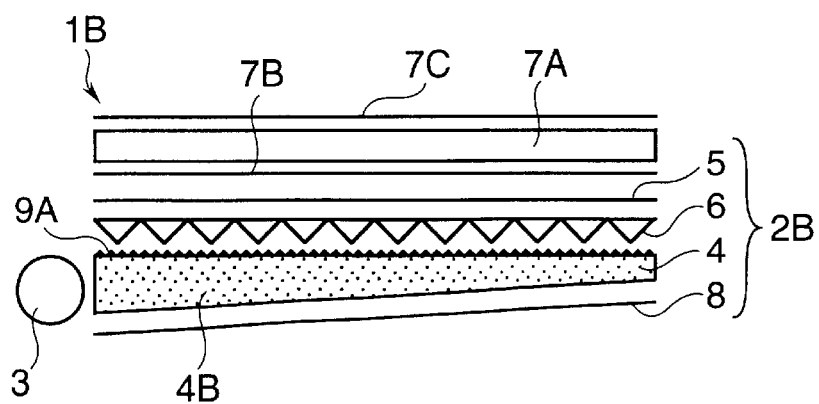
FIG. 14 is a simplified side view that shows yet another liquid-crystal display apparatus according to the prior art.
Figure 15:
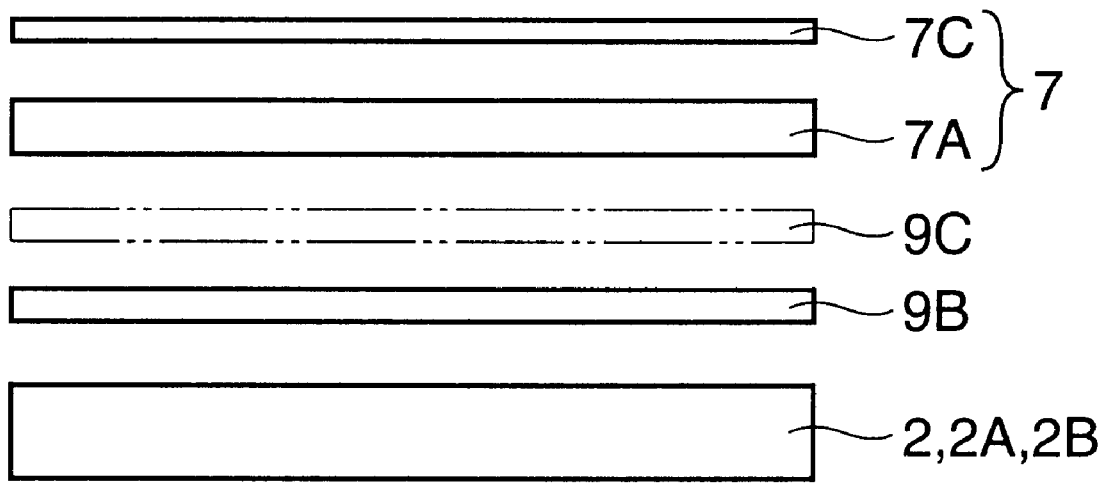
FIG. 15 is a simplified side view that shows still yet another liquid-crystal display apparatus according to the prior art.

It is also possible to use a light guide and/or prism sheet as shown in FIG. 13 and FIG. 14, in place of the light guide 62 and prism sheet 22.

Next, a directly subpositioned (directly backlighted) planar light source apparatus 70 will be described, with reference being made to FIG. 10.

This directly subpositioned planar light source apparatus 70 has a light-diffusing sheet 68, which is disposed along the coating layer 14 of on the rear surface of the polarization splitting sheet 10, 30, or 40 (shown in FIGS. 1, 6, and 7, respectively), light from a light source 64 being reflected by a concave reflecting surface 66, and light from the light-diffusing sheet 68 also being emitted to the polarization splitting sheet 10, 30, or 40 directly.

In this planar light source apparatus 70 as well, similar to the above-described case of the planar light source apparatus 60, the spherical beads 16 of the coating layer 14 of the polarization splitting sheet 10, 30, or 40 do not cause damage to the prism sheet 22, and even if the prism sheet 22 is omitted, the damage to the light-diffusing sheet 68 is extremely slight.

While both the above-described planar light source apparatuses 60 and 70 use a single polarization splitting sheet, the present invention presents no particular restriction in this regard, and it is possible to use two or three or more polarization splitting sheets as well in the present invention. Thus, even using a plurality of polarization splitting sheets overlaid on one another, because the variation in protrusion height of the spherical beads 16 from the rear surface of the polarization splitting sheet is small, there is no damage to another optical material or to a unit prism by a concentration of load.

Figure 11:
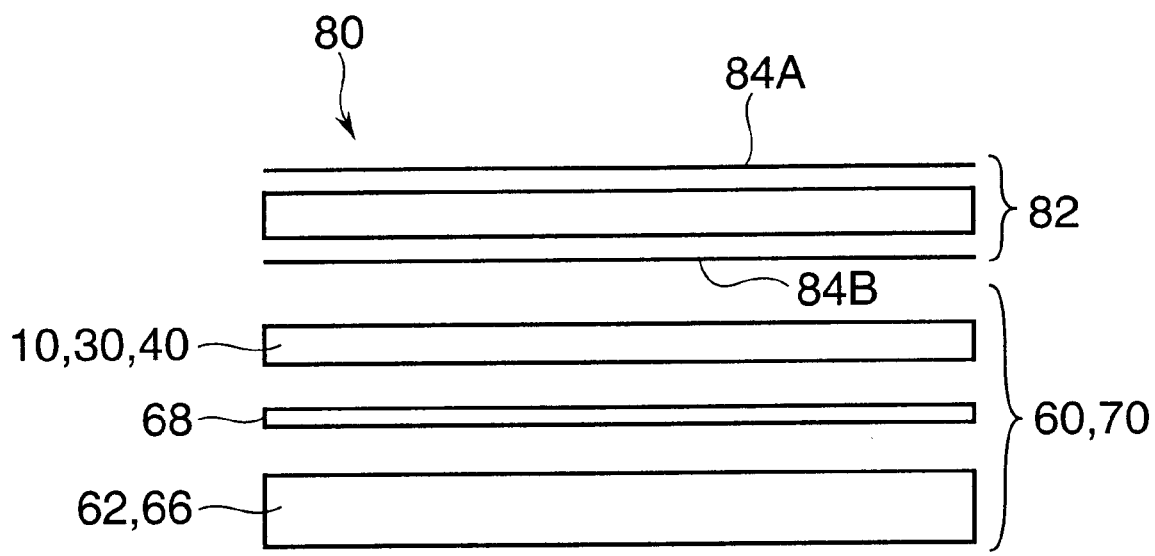
FIG. 11 is a cross-sectional view that shows a schematic representation of the main parts of a liquid-crystal display apparatus that uses a planar light source apparatus that includes a polarization splitting sheet according to the present invention.
Figure 12:
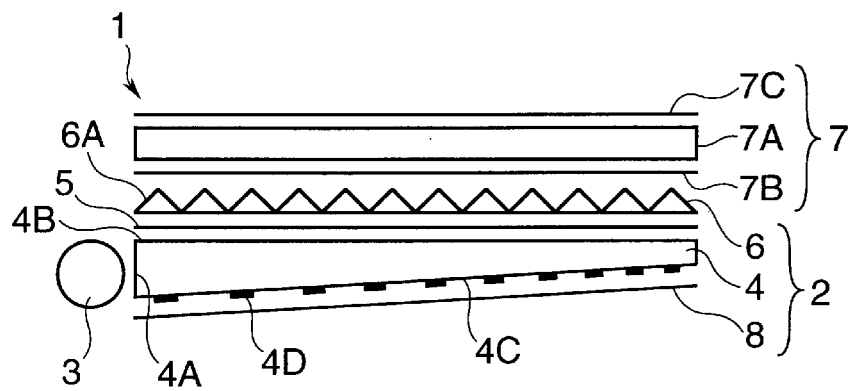
FIG. 12 is a simplified side view that shows a liquid-crystal display apparatus according to the prior art.

Next, an embodiment of a liquid-crystal display apparatus 80 will be described, with reference being made to FIG. 11.

Figure 10:
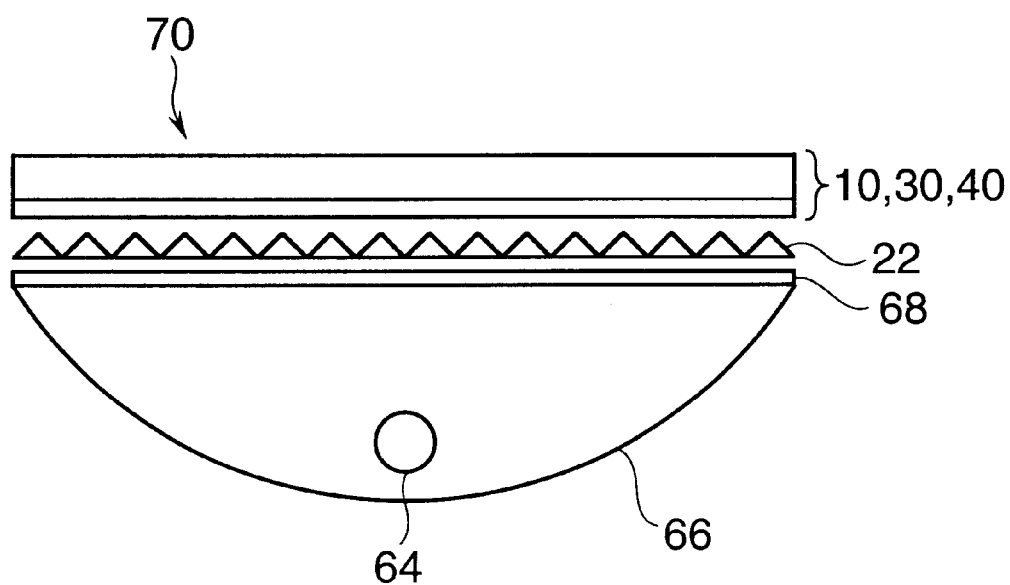
FIG. 10 is a cross-sectional view that shows a schematic representation of the second embodiment of a planar light source apparatus according to the present invention.

The liquid-crystal display apparatus 80 is formed by placing a liquid-crystal panel 82 on the light exiting side of the planar light source apparatus 60 or 70 such as shown in FIG. 9 or FIG. 10.

This liquid-crystal display apparatus 80 is a transmission-type display apparatus, in which the pixels which form the liquid-crystal screen are illuminated from the rear by light that is emitted from the above-noted planar light source apparatus 60 or 70 and wherein, of the polarizers 84A and 84B at the front surface and rear surface of the liquid-crystal panel 82, the polarization transmission axis of the polarizer 84B at the rear surface (that is, the backlighting side) is caused to approximately coincide with the polarization axis of the light output from the planar light source apparatus 60 or 70, so that the polarized light is transmitted with good efficiency.

In this liquid-crystal display apparatus 80, because as described above there are no interference fringes in the illumination light, it is possible to form a high-quality image.

A more specific embodiment of the present invention can be made as a planar light source apparatus similar to that shown in FIG. 9, which uses a polarization splitting sheet 10, 30, or 40.

The polarization splitting sheet 10, 30, or 40 is formed by disposing spherical beads 16 onto the surface of a transparent base material sheet 12, as follows.

The light-transmitting beads used as the material for the spherical beads 16 are applied as a paint which comprises crosslinked acrylic resin (n=1.49) beads in a binder of polyester resin (n=1.55).

More specifically, an ink containing 8% of the above-noted light-transmitting beads with respect to the above-noted binder resin is diluted to a MEK:toluene ratio of 1:1, and viscosity thereof established as 27 seconds in a Zahn cup-type viscosity meter.

This ink is applied to the rear surface of the polarization splitting sheet 10, 30, or 40 using a slit reverse coating method, after which the solvent is dried to harden the ink film.

The dried film that is formed in the above-noted manner has a two-dimensionally random arrangement of spherical beads, having a 10-point average roughness of Rz=3 μm (according to JIS B0601), with an average interval of d=30 μm.

The light guide 62 in the planar light source apparatus 60 has formed on its rear surface by printing the light-diffusing layer 62D in dot-shape. In the case of the polarization splitting sheet 10, there are a total of 100 layers (only 3 being shown in FIG. 5, whereas the actual embodiment has 100 layers) of PC and PMMA layers, which are adjacent in an alternating manner, starting at the light incidence side. The light-diffusing sheet 68 is formed by coating acrylic beads having an average diameter of 10 μm onto the light exiting surface of a PET sheet having a thickness of 1.25 mm, so that the light exiting surface is rougher than the light incidence surface.

The light-reflecting sheet 66 is made of a white PET sheet which has been subjected to foaming. Additionally, the direction of maximum intensity of diffused light from the light guide 62 is, according to the light-diffusing sheet 68, approximately coincident with the Brewster angle of the polarization splitting sheet 10.

Additionally, the transmission axis of polarized light of the polarizer on the light guide 62 side of the liquid-crystal panel (not shown in the drawing) is caused to coincide with the polarization axis of the light that is emitted from the polarization splitting sheet 10, so that the polarized light is transmitted with good efficiency.

With the above-noted liquid-crystal panel set into the transmitting mode, a measurement of the intensity of light emitted from the polarizer on the front side thereof showed an improvement of 30% in the maximum intensity, compared with the case of using a backlighting apparatus not provided with the polarization splitting sheet 10.

The average diameter of the light-transmitting beads was varied (more specific embodiments 1 through 5 and comparative examples 1 and 2), these beads being used to form polarization splitting sheets 10 such as described above. These were installed in a planar light source apparatus such as shown in FIG. 9 and FIG. 10, the results of observations thereof in a darkroom being as shown in Table 1.

TABLE 1

| | Average bead diameter | 10-pt average roughness Rz | Interference fringes |
| --- | --- | --- | --- |
| Embodiment | 5 μm | 3 μm | None |
| Embodiment 2 | 3 μm | 2 μm | None |
| Embodiment 3 | 1.5 μm | 1 μm | None |
| Comparative example | 0.5 μm | 0.3 μm | Appeared |
| Embodiment 4 | 8 μm | 5 μm | None |
| Embodiment 5 | 10 μm | 7 μm | None |
| Comparative example 2 | 15 μm | 9 μm | Appeared |

The results, shown in Table 1, demonstrate that interference fringes occur only in the cases of comparative examples 1 and 2.

The results of an experiment in which the bead sides of a polarization splitting sheet onto which were coated spherical beads 16 having a diameter distribution according to the present invention and of a polarization splitting sheet onto which were coated spherical beads having a distribution of bead diameter with a large variation were caused to come into contact with, for example a prism surface, with a weight of 10 g resting on top as the sheet was slid, it was seen that the larger is the bead diameter distribution variation, the greater is the damage that occurs. In particular in the case in which the half-value width of the diameter distribution was 1 μm or smaller, there was very little damage to the prism surface.

Next, a more specific embodiment of the present invention which makes use of the polarization splitting sheet 40, such as shown in FIG. 7, instead of the polarization splitting sheet as used in the above-noted embodiment, will be described. Note that other elements and features of this embodiment are the same as the above-described more specific embodiment.

It should also be noted that, while only four layers are shown in this polarization splitting sheet in FIG. 7, the more specific embodiment is formed by the lamination of 100 layers.

With a liquid crystal panel (not shown in the drawing) having a backlighting apparatus that includes the polarization splitting sheet 40 such as this set into the transmitting mode, a measurement of the maximum intensity of light emitted from the polarizer on the front side thereof showed a 50% improvement in intensity, compared with the case of using a backlighting apparatus not provided with the polarization splitting sheet, and it was not possible to observe interference fringes.

Observations of polarization splitting sheets as described above were fabricated with light-transmitting beads having various average diameters indicated the same kind of results as shown in Table 1.

Even in a more specific embodiment of the present invention which makes use of the polarization splitting sheet 30, such as shown in FIG. 6, instead of the polarization splitting sheet 10, there is a similar improvement in light intensity, interference fringes are not observed, and the results obtained were similar to those shown in Table 1.

The results of an experiment in which the bead sides of a polarization splitting sheet onto which were coated spherical beads 16 having a diameter distribution according to the present invention and of a polarization splitting sheet onto which were coated spherical beads having a distribution of bead diameter with a large variation were caused to come into contact with, for example a prism surface, with a weight of 10 g resting on top as the sheet was slid, it was seen that the larger is the bead diameter distribution variation, the greater is the damage that occurs. In particular in the case in which the half-value width of the diameter distribution was 1 μm or smaller, there was very little damage to the prism surface.

By virtue of the technical constitution of the present invention, as described in detail above, a polarization splitting sheet according to the present invention solves the problem of the occurrence of interference fringes unrelated to external light that are generated in a polarization splitting sheet and, in a planar light source apparatus and transmission-type display that use this optical sheet, it is possible to obtain a high-quality image without the observation of interference fringes, in addition to achieving the effect of a great reduction in damage to a sheet of material that comes into contact with this polarization splitting sheet.

What is claimed is:

1. A polarization splitting sheet made of a light-transmitting base material that includes a circulation selection layer acting to split, from an incident light, one of right or left circular polarized light component by reflecting and another of right or left circular polarized light component by transmitting, one side of said polarization splitting sheet being covered by a coating layer that includes light-transmitting beads having a bead diameter in the range from 1 to 10 μm, the light-transmitting beads are randomly dispersed on the surface of the coating layer.

2. A polarization splitting sheet according to claim 1, wherein at least some of said light-transmitting beads included in said coating layer are light-transmitting beads having a diameter distribution with a half-value width of 1 μm or smaller.

3. A polarization splitting sheet according to claim 1, wherein said circulation selection layer is made of a cholesteric layer.

4. A polarization splitting sheet according to claim 1, wherein said polarization splitting sheet further includes a quarter wave layer.

5. A polarization splitting sheet according to claim 1, wherein said coating layer of said polarization splitting sheet is in physical contact with unit prisms or unit lenses of an adjacently laminated prism sheet.

6. A polarization splitting sheet according to claim 5, wherein the vertex angle at the end of the unit prisms or units lenses of said prism sheet, which makes contact with said coating layer, is 100° or smaller.

7. An optical sheet laminate comprising a polarization splitting sheet made of a light-transmitting base material that includes a circulation selection layer acting to split, from an incident light, one of right or left circular polarized light component by reflecting and another of right or left circular polarized light component by transmitting, one side of said polarization splitting sheet being covered by a coating layer that includes light-transmitting beads having a bead diameter in the range from 1 to 10 μm, the light-transmitting beads are randomly dispersed on the surface of the coating layer, and a prism sheet that includes unit prisms or unit lenses laminated with said polarization splitting sheet, said coating layer of said polarization splitting sheet being in physical contact with said unit prisms or unit lenses of the adjacently laminated prism sheet.

8. An optical sheet laminate according to claim 7, wherein at least some of said light-transmitting beads included in said coating layer are light-transmitting beads having a diameter distribution with a half-value width of 1 μm or smaller.

9. An optical sheet laminate according to claim 7, wherein the vertex angle at the end of the unit prisms or units lenses of said prism sheet, which makes contact with said coating layer, is 100° or smaller.

10. A planar light source apparatus comprising a light guide that is in the form of a plate, made of a light-transmitting material, light which is guided into said guide from at least one end surface of thereof exiting from a light exiting surface thereof, which is another surface of said light guide, a light source that causes a light to strike said at least one end surface of said light guide, and a polarization splitting sheet being provided on said light exiting surface of said light guide, said polarization splitting sheet is made of a light-transmitting base material that includes a circulation selection layer acting to split, from an incident light, one of right or left circular polarized light component by reflecting and another of right or left circular polarized light component by transmitting, one side of said polarization splitting sheet being covered by a coating layer that includes light-transmitting beads having a bead diameter in the range from 1 to 10 μm, the light-transmitting beads are randomly dispersed on the surface of the coating layer.

11. A planar light source apparatus according to claim 10, wherein at least some of said light-transmitting beads included in said coating layer are light-transmitting beads having a diameter distribution with a half-value width of 1 μm or smaller.

12. A planar light source apparatus comprising a light-diffusing sheet, a light source that shines light onto said light-diffusing sheet, a reflector, which is located on the opposite side of said light source from said light-diffusing sheet, and which reflects light from said light source in the direction of said light-diffusing sheet, and a polarization splitting sheet, which is made of a light-transmitting base material that includes a circulation selection layer acting to split, from an incident light, one of right or left circular polarized light component by reflecting and another of right or left circular polarized light component by transmitting, one side of said polarization splitting sheet being covered by a coating layer that includes light-transmitting beads having a bead diameter in the range from 1 to 10 μm, the light-transmitting beads are randomly dispersed on the surface of the coating layer.

13. A planner light source apparatus according to claim 12, wherein at least some of said light-transmitting beads included in said coating layer are light-transmitting beads having a diameter distribution with a half-value width of 1 μm or smaller.

14. A transmission-type display apparatus comprising a planar light transmission-type display element, and a planar light source apparatus, which is provided on the rear surface of said light transmission-type display element, and which illuminates said light transmission-type display element from the rear thereof, with the light that it emits, and said planar light source apparatus comprising a light guide that is in the form of a plate, made of a light-transmitting material, light which is guided into said guide from at least one end surface of thereof exiting from a light exiting surface thereof, which is another surface of said light guide, a light source that causes light to strike said at least one end surface of said light guide, and a polarization splitting sheet being provided on said light exiting surface of said light guide, said polarization splitting sheet is made of a light-transmitting base material that includes a circulation selection layer acting to split, from an incident light, one of right or left circular polarized light component by reflecting and another of right or left circular polarized light component by transmitting, one side of said polarization splitting sheet being covered by a coating layer that includes light-transmitting beads having a bead diameter in the range from 1 to 10 μm, the light-transmitting beads are randomly dispersed on the surface of the coating layer.

15. A transmission-type display apparatus according to claim 14, wherein at least some of said light-transmitting beads included in said coating layer are light-transmitting beads having a diameter distribution with a half-value width of 1 μm or smaller.

16. A transmission-type display apparatus comprising a planar light transmission-type display element, and a planar light source apparatus, which is provided on the rear surface of said light transmission-type display element, and which illuminates said light transmission-type display element from the rear thereof, with the light that it emits, and said planar light source apparatus comprising a light-diffusing sheet a light source that shines light onto said light-diffusing sheet, a reflector, which is located on the opposite side of said light source from said light-diffusing sheet, and which reflects light from said light source in the direction of said light-diffusing sheet, and a polarization splitting sheet, which is made of a light-transmitting base material that includes a circulation selection layer acting to split, from an incident light, one of right or left circular polarized light component by reflecting and another of right or left circular polarized light component by transmitting, one side of said polarization splitting sheet being covered by a coating layer that includes light-transmitting beads having a bead diameter in the range from 1 to 10 μm, the light-transmitting beads are randomly dispersed on the surface of the coating layer.

17. A transmission-type display apparatus according to claim 16, wherein at least some of said light-transmitting beads included in said coating layer are light-transmitting beads having a diameter distribution with a half-value width of 1 μm or smaller.

\* \* \* \* \*